Sept. 12, 1967

N. R. GUILBERT, JR 3,341,037

VEHICLE POSITIONING APPARATUS

Filed Sept. 17, 1965

INVENTOR
NICHOLAS R. GUILBERT, JR.

BY

ATTORNEY

Sept. 12, 1967     N. R. GUILBERT, JR     3,341,037
VEHICLE POSITIONING APPARATUS
Filed Sept. 17, 1965     2 Sheets-Sheet 2
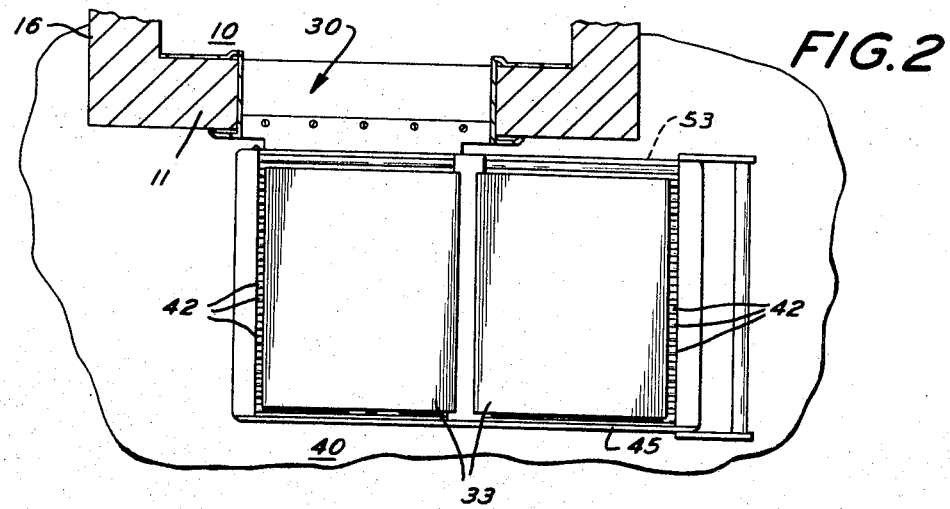
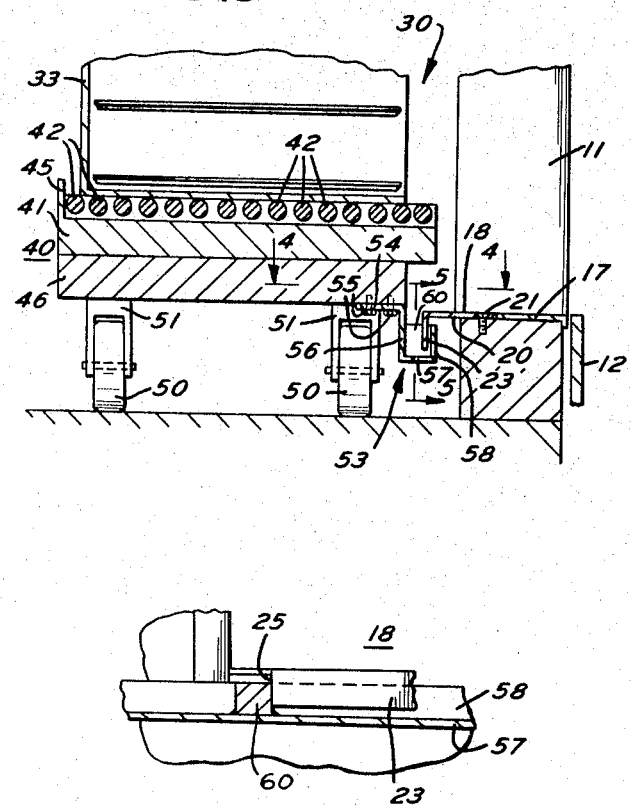
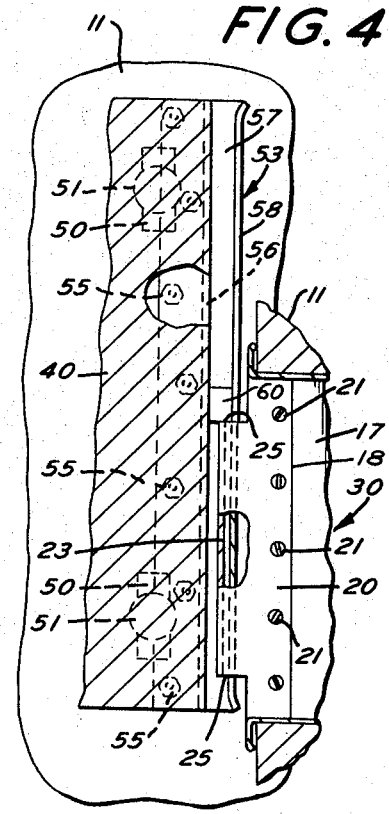
INVENTOR
NICHOLAS R. GUILBERT, JR.
BY
ATTORNEY United States Patent Office 3,341,037
Patented Sept. 12, 1967

3,341,037
VEHICLE POSITIONING APPARATUS
Nicholas R. Guilbert, Jr., Glenside, Pa., assignor to Guilbert, Inc., Philadelphia, Pa., a corporation of Pennsylvania
Filed Sept. 17, 1965, Ser. No. 488,188
8 Claims. (Cl. 214—38)

ABSTRACT OF THE DISCLOSURE

Orienting and positioning apparatus for carts used to deliver articles from a dumbwaiter at a shaft opening wherein the cart is guided to a location for loading and positioned precisely by interengaging members on the cart and at the shaft opening.

This invention relates to improvements in orienting and positioning apparatus for article handling and more particularly to locating and retaining apparatus for carts used for transfer of articles in loading and unloading elevators, dumbwaiters and the like.

In the unloading of dumbwaiters, considerable difficulty has been experienced in positioning and holding the carrier or cart onto which the goods are to be unloaded from the dumbwaiters or elevators. No wholly satisfactory provisions have heretofore been made to solve the problem.

The principal object of the present invention is to provide locating and retaining apparatus for vehicles used to move articles from and to a dumbwaiter or elevator that is simple and inexpensive to construct and install but which is sturdy, reliable, and effective, in service.

A further object of the present invention is to provide locating and retaining apparatus for such vehicles that is suitable for use with a minimum of effort and skill on the part of the user of the vehicle.

A further object of the present invention is to provide locating and retaining apparatus for such vehicles that is positive in operation and which accurately aligns and holds the vehicle to be loaded.

Other objects and advantageous features of the invention will be apparent from the description and claims.

The nature and characteristic features of the invention will be more readily understood from the following description, taken in connection with the accompanying drawings forming part thereof, in which:

FIG. 2 is a fragmentary horizontal sectional view showing a cart in accordance with the invention at another position for cart loading;

FIG. 3 is a side sectional view, taken approximately on the line 3—3 of FIG. 1 showing the locating and retaining apparatus for the cart;

FIG. 4 is a fragmentary horizontal sectional view, enlarged, taken approximately on the line 4—4 of FIG. 3;

FIG. 5 is a fragmentary vertical sectional view, enlarged, taken approximately on the line 5—5 of FIG. 3.

Figure 1:
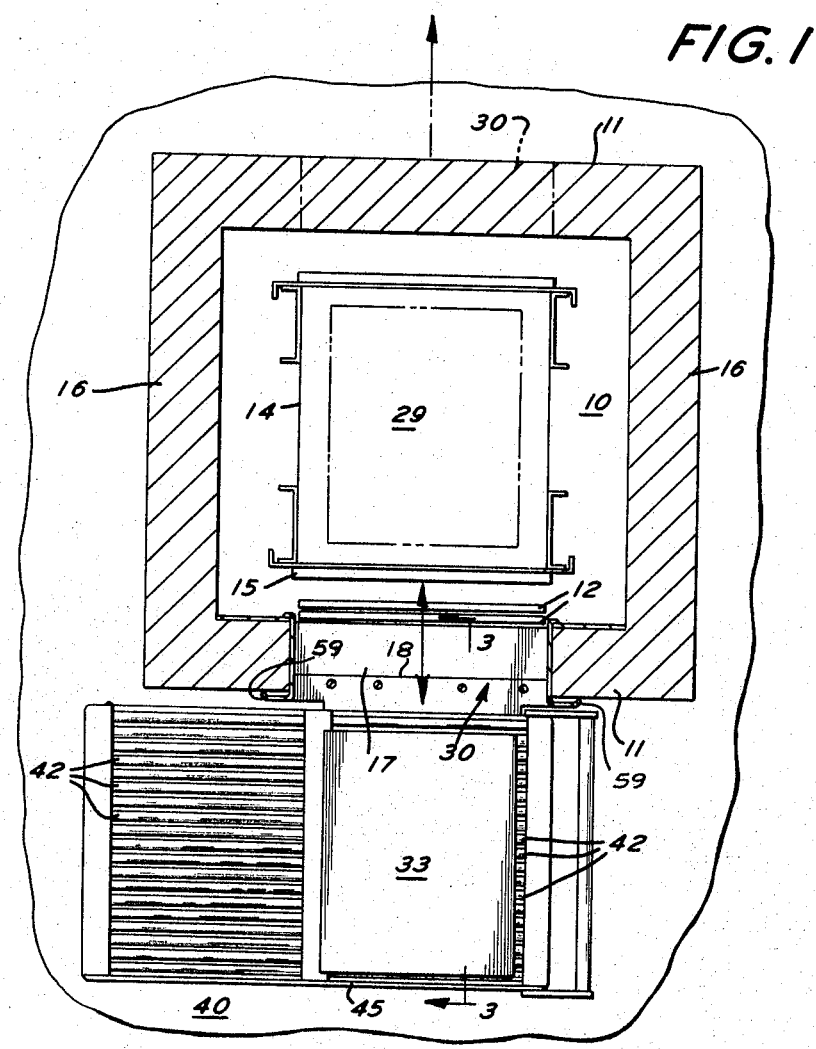
FIGURE 1 is a horizontal sectional view of a dumbwaiter or elevator shaft showing a cart located at one position at an access opening for cart loading.
Figure 6:
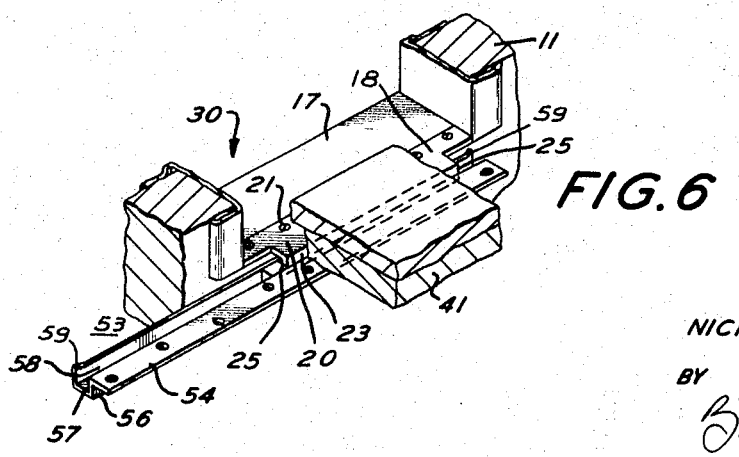
FIG. 6 is a fragmentary view in perspective showing the locating and retaining apparatus.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to the drawings in which the invention is shown in a particular embodiment, a portion of a vertical elevator or dumbwaiter shaftway 10 is illustrated. The shaftway 10 consists of two vertical side walls 16 and two vertical side walls 11 which are shown with front and rear access openings 30 which are normally closed by hatchway doors 12. A dumbwaiter car 14 which is guided and movable vertically along rails (not shown) is provided and preferably has doors 15. The car 14 can be of conventional construction but is preferably provided with automatic or automatically controlled unloading apparatus 29 for delivery of articles to an exact location outside the shaftway 10. One suitable form of apparatus for that purpose is shown in my prior application Serial No. 246,895 filed December 26, 1962, now Patent No. 3,237,789. The access openings 30 are provided at each level at which loading and unloading are desired.

The access openings 30 can be provided with a flat horizontal sill 17 at their lower portion. This sill 17 has a horizontal rail 18 attached thereto which rail 18 extends longitudinally of the access opening 30. The rail 18 has a horizontal connecting flange 20 attached to the sill 17 by bolts or screws 21 as desired. The flange 20 has a vertical flange 23 integral therewith extending the major portion of the length of the access opening 30 at the edge of the access opening 30 and has ends 25, which serve as abutments for limiting travel along the rail 18.

While any desired articles can be handled for a particular use a tray carrier 33 is provided for the reception of dishes or other objects to be transported by the dumbwaiter to predetermined locations and which can be any suitable receptacle or object desired to be transported.

A receiving vehicle such as a cart 40 is illustrated which comprises an upper platform 41 having antifriction rollers 42 carried thereon and extending lengthwise of the cart 40 and which are positioned so as to facilitate objects being loaded onto the cart platform 41 and freely movable thereon.

A stop or retaining ledge 45 is provided for limiting the movement of objects placed on the cart platform 41 and to prevent their falling off the edge of the platform 41. The cart 40 has a lower portion 46 which can be a flat bed to which is attached a plurality of front and rear pairs of wheels 50 by connecting wheel suspension members 51.

The cart 40, along one side edge margin thereof preferably has a U-shaped channel member 53 carried thereby for sliding interengagement with the rail 18 as pointed out below. The channel 53 has a horizontal supporting flange 54 through which bolts 55 extend for fastening the flange 54 to the under surface of the bed 46. The channel 53 has, integral with the flange 54, a vertical connecting strip 56, horizontal bottom member 57 and vertical flange 58. The ends 59 of the flange 58 can be outturned to facilitate the sliding interengagement of the channel 53 and rail 18.

The channel member 53, intermediate its ends, has a block 60 which provides a stop member for engagement with one or the other of the end abutments 25 for limiting the movement of the cart 40 dependent upon the direction of initial sliding engagement of the channel member 53 with the rail 18.

The mode of operation will now be pointed out.

The car 14 is loaded with a tray carrier 33 or other object as desired. The car 14 is then raised or lowered as required to the desired location adjacent the access opening 30. The shaftway doors 12 and car doors 15 are opened.

Before or after the doors 12 and 15 are opened a receiving cart 40 is brought up to the edge of the rail 18 which is fastened to the sill 17. The end of the rail 18 is inserted into the channel 53 and with the channel 53 engaged with the rail 18. The cart 40 is moved until the stop block 60 engages one of the end abutments 25. In this position, as shown in FIG. 2, it is positively located in front of the access opening 30 and is ready to receive articles desired to be loaded on it. The unloading mechanism 29 is then activated and the tray carrier 33 or other object is unloaded onto the cart and is restrained by the ledge 45 of the cart 40.

The cart 40 is then moved backward and the channel 53 is disengaged from the rail 18. The cart 40 is moved past the opening 30 until the end of the channel 53 clears the end of the rail 18. The rearward end of the channel 53 is inserted into the other end of the rail 18 and the cart 40 is moved along until it abuts the stop 25 which stops further movement. In this position the remaining one half of the cart can be loaded. The cart 40 is then moved by the attendant to other locations for unloading as desired.

The loading of the car carried unloading apparatus 29 for return of articles such as tray carriers, soiled dishes or the like can be readily effected by a reversal of the operations just described.

The positive positioning or locating of the cart 40 with the structure heretofore described makes for better handling of the articles with reduced labor, and with reduction of breakage and/or mishandling.

I claim:
1. In combination with a shaftway having a car vertically movable therein to a shaftway access opening the combination of
   a first horizontally elongated positioning member fixedly mounted in front of said access opening at a predetermined level,
   a vehicle movable with respect to said opening,
   a second horizontally elongated positioning member fixedly carried by said vehicle at a predetermined level corresponding to the level of the first positioning member and horizontally slidably engageable with said first positioning member for locating said vehicle at a predetermined distance in front of said opening,
   each of said members having a stop portion for engagement with a stop portion on the other to determine the positioning of said vehicle longitudinally along the front of said opening.
2. The combination as defined in claim 1 in which said vehicle is a wheeled vehicle and has a horizontal article receiving platform.
3. The combination as defined in claim 2 in which said platform has anti-friction members thereon.
4. The combination as defined in claim 1 in which said first positioning member has a horizontally elongated vertical portion, and
   said second positioning member has a horizontally elongated vertical portion for engagement with the vertical portion of said first member.
5. The combination as defined in claim 4 in which said first positioning member is a fixedly mounted rail.
6. The combination as defined in claim 4 in which said second positioning member is a channel.
7. The combination as defined in claim 4 in which said first positioning member is a fixedly mounted rail, and
   said second positioning member is a channel.
8. The combination as defined in claim 1 in which said vehicle has an article receiving platform, and
   said car has unloading apparatus for delivering an article onto said platform.

References Cited
UNITED STATES PATENTS

| 1,869,468 | 8/1932 | Cope et al. | |
| 2,790,567 | 4/1957 | Rockhill | 214—95 |
| 3,150,787 | 9/1964 | Patrignani | 214—38 X |
| 3,261,650 | 7/1966 | Stromqvist | 214—38 X |

GERALD M. FORLENZA, *Primary Examiner.*

ROBERT G. SHERIDAN, *Examiner.*